United States Patent [19]

Matuschek

[11] Patent Number: 4,688,317

[45] Date of Patent: Aug. 25, 1987

[54] RIVET INSTALLATION METHOD

[75] Inventor: Josip Matuschek, Newport Beach, Calif.

[73] Assignee: Textron, Inc., Providence, R.I.

[21] Appl. No.: 766,778

[22] Filed: Aug. 16, 1985

[51] Int. Cl.$^4$ ............................................. B23P 11/00
[52] U.S. Cl. .................................. 29/509; 29/526 A; 403/408.1; 403/274; 411/501; 411/506
[58] Field of Search ............... 29/509, 522 A, 522 R, 29/526 A; 411/504, 501, 500, 505–507; 403/408.1, 274, 282; 72/325, 479

[56] References Cited

U.S. PATENT DOCUMENTS

| 105,031 | 7/1870 | Boyd | 411/501 |
|---|---|---|---|
| 624,927 | 5/1899 | Gunnell | 29/509 R |
| 959,673 | 5/1910 | Wood et al. | 72/479 |
| 1,228,239 | 5/1917 | Phillips | 411/507 |
| 1,688,423 | 10/1928 | Jardine | 29/522 R |
| 3,014,609 | 12/1961 | Hobbs | 29/509 R |
| 3,391,449 | 7/1968 | Briles | 29/522 |
| 3,505,923 | 4/1970 | Neill | 411/501 |
| 3,842,710 | 10/1974 | Poupitch | 411/504 |
| 4,048,708 | 9/1977 | Briles | 29/509 |
| 4,086,839 | 5/1978 | Briles | 29/509 |
| 4,223,433 | 9/1980 | Rosman | 29/526 A |

FOREIGN PATENT DOCUMENTS

| 2411272 | 10/1974 | Fed. Rep. of Germany | 411/506 |
|---|---|---|---|
| 1020290 | 2/1953 | France | 29/509 |
| 929898 | 5/1982 | U.S.S.R. | |

Primary Examiner—Daniel C. Crane
Attorney, Agent, or Firm—Knobbe, Martens, Olson & Bear

[57] ABSTRACT

A rivet installation method creates a preload on the workpieces being joined. The rivet shank is urged to resist compression during installation while a ring on the end of the shank is compressed against the workpieces. Withdrawing the compression releases the shank to provide the preload.

17 Claims, 21 Drawing Figures

TOOL MOVEMENT

TOOL MOVEMENT

TOOL MOVEMENT

TOOL MOVEMENT

TOOL MOVEMENT

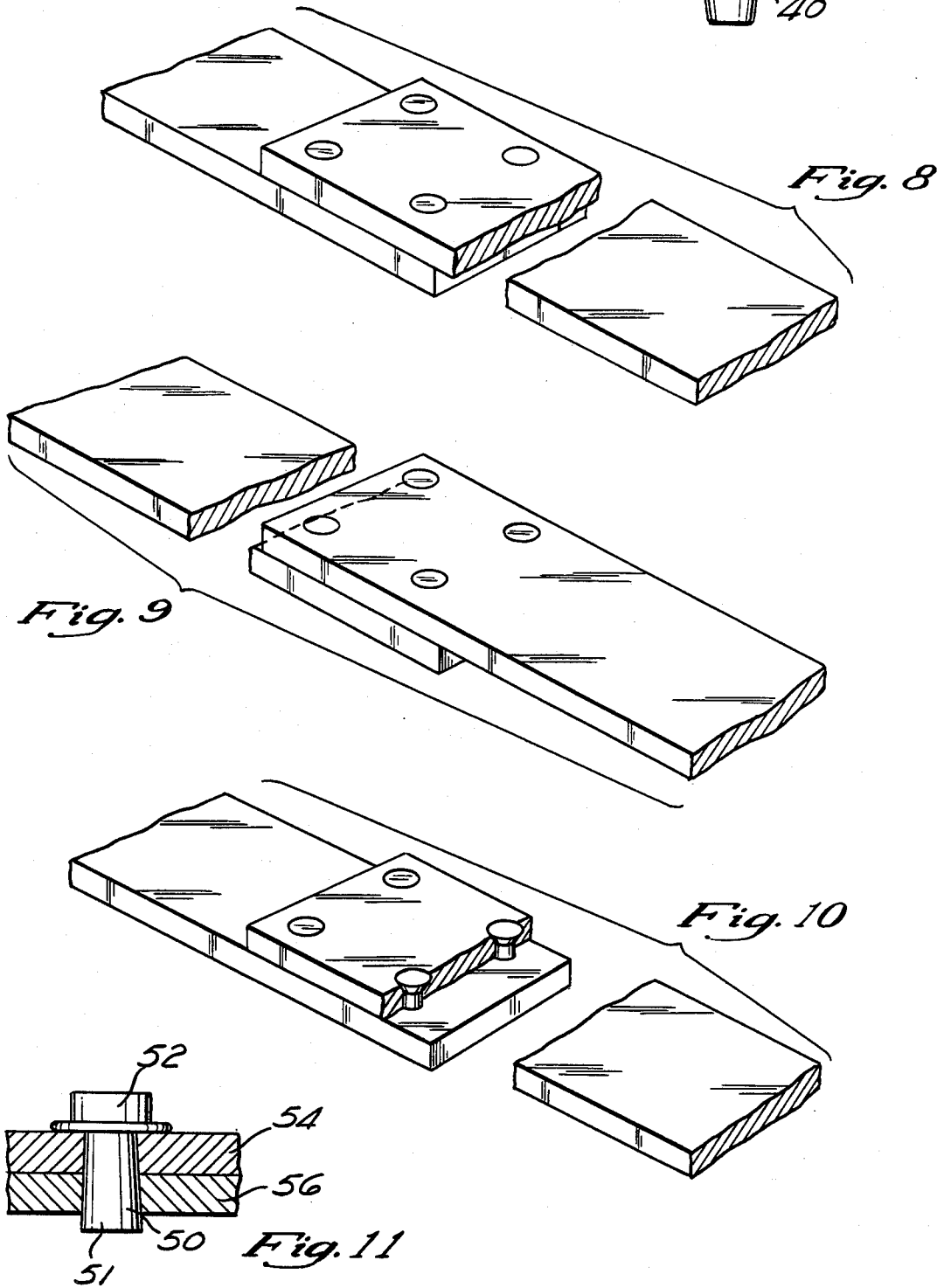

RIVET INSTALLATION METHOD

BACKGROUND OF THE INVENTION

This invention relates to a method of installing a rivet in a plurality of workpieces, and to the resulting riveted joint, as well as the rivet itself.

One rivet-type fastener commonly used in aircraft constructions includes a shank with a manufactured head on one end and a tail on the other end. In use, the tail end of the shank is inserted through aligned holes of two or more workpieces with the rivet head engaging the outer face of one of the workpieces and with the tail extending beyond the outer faces of the other workpiece. The tail is then deformed by means of an axial force, compressing the rivet axially and upsetting the tail material outwardly to form an upset head which is larger in diameter than the hole through the workpieces, so that the two workpieces are fastened together.

In one highly successful rivet, or shear pin, of this general type, the shank which extends through the workpieces is made of a strong material which is high in shear strength while the tail is made of a more ductile material which is easier to deform than the shank. The two metals are typically joined together by friction welding. In one example of this type, the shank is formed of (95 ksi shear) 6AL-4V titanium alloy while the tail is formed of 55 Ti 45 Cb titanium alloy. Such a fastener is sold by the assignee of the present invention under the trademark Cherry BUCK. U.S. Pat. No. 3,848,389 issued to Gapp, et al. further describes bimetallic shear pins of this general type.

All types of fasteners having a tail to be upset are often installed by squeezing, wherein the ductile tail is compressed until the upset head formed attains a diameter of about 1.3 to 1.5 times the initial shank diameter. When the squeezing force used to form the upset head is released, the column of the rivet shank "springs back" or lengthens a certain distance. Although the material of the workpiece being fastened also springs back, some of the materials in common use do not spring back as much as the rivet shank, with the result that a small gap is created between portions of the upset head and the workpiece after the installation is complete. For example, a sold rivet of 2117T3 aluminum, used for many years in large quantities in the aircraft industry and commonly referred to as an AD rivet, when installed in 7075T6 aluminum material can exhibit a small gap between the upset head and the workpiece. However, some gap is acceptable for most practical uses except those involving high fatigue loads.

In aircraft structures, particularly those involving shear fatigue loading of the fastener, it is desirable that the gap between the upset head and the workpiece be zero. Ideally, the underside of the upset head should exert a compression force against the workpiece after the installation. When such a loading is achieved, the fastener is said to exert a residual tension force against the workpiece after installation. This loading is often referred to as a "preload" in the joint.

While millions of rivets of the type having a ductile tail and a strong shank have been used satisfactorily, their use has been limited in areas involving shear fatigue loading due to the inability to provide a preload. A fastener of this type which provides a preload is usable in a much extended range of applications, particularly those involving shear fatigue and light tension fatigue or a combination of both. Further, the ability to use a bi-metallic fastener in fatigue applications is of great benefit to the aircraft industry because it is the lightest shear pin type fastener available with a 95 ksi shear rating. In the aircraft industry, weight savings are very valuable. Savings of one pound of weight can be worth $1,000 to the designer in some critical areas of an aircraft design.

Another type of shear pin fastener consists of a bolt with a small head on one end and a small light nut threaded on the other end. The small head and nut are of sufficient strength to develop close to the full shear strength of the fastener when it is installed in two or more workpieces, but not of sufficient strength to develop the full tensile strength of the fastener. In joints involving high axial tension loads, tension type fasteners are used. Typically, these have larger and stronger manufactured heads and larger and stronger matching nuts. These tension type fasteners are, of course, heavier. The size and weight of the squeezed tail of the one piece shear pin herein described is much smaller than the nut and threaded portion of a threaded pin and nut-type shear pin fastener of the same strength. Also, the small height and size of the squeezed tail of the shear pin is advantageous with regard to the installation and positioning of other components in crowded areas within aircraft or other assemblies.

A one-piece fastener is particularly desirable as opposed to a two-piece fastener in that it is easy to feed and install using automatic equipment. Most fasteners of this general type which are capable of providing a significant preload are of the two-piece design. Two-piece designs involve serious feeding problems when automatic or robot installation is attempted. Automated installation of fasteners is advancing rapidly in the aircraft industry because it is cheap and produces much more uniform and satisfactory joints. In the past, preload in a riveted joint has been achieved by using hot rivets which, after being upset, contract upon cooling and produce the desired preload in the joint. This hot rivet approach of course adds other costs and complexities; and while it is still used in large commercial structures, such as bridges, it is not used in aircraft structures.

Accordingly, a substantial need exists for a method of installing a one-piece, cold, upset rivet or shear pin fastener in a manner which can provide a significant axial preload.

SUMMARY OF THE INVENTION

In accordance with the invention, an installation method is provided which produces a riveted joint with the desired preload on the workpieces through which the rivet extends. This is accomplished by applying a deforming force to the rivet tail to form an upset against the portion of the workpiece surrounding the hole in the workpiece, while applying force to the rivet shank sufficient to resist compression or to slightly stretch the shank. The elongating force is then withdrawn allowing the rivet shank to "spring back" providing a preload on the workpieces. A manufactured or an upset head is, of course, on the other end of the shank to surround the hole on the other workpiece.

In a preferred approach, the installation method includes a two-step, compressive approach using a two-part tool assembly. With the rivet tail extending beyond the outer face of one of the workpieces, a first axial compressive force is applied to the rivet using a suitable pin-like tool, causing the tail of the rivet to be deformed axially and deformed radially outwardly to form an upset head substantially larger than the hole through the adjacent workpiece. This first step is essentially the same as that currently being utilized in installing rivets of this type.

As the second major step of the installation method, the tool which formed the upset head is unloaded, and a second tool which surrounds the first tool is squeezed onto the upset head. This outer tool preferably has a cylindrical opening formed therein so as to be slidably mounted on the inner pin-like tool. The circular edge of the cylindrical opening of the outer tool engages the outer ring of the upset head; and as the outer tool is moved downwardly onto the upset head, it starts to shear the outer ring of the upset head. Continued downward movement of the outer tool flattens the sheared or swaged ring while it remains integrally connected at its inner edge with the upset head. During the forming of this ring, the upset head material is, of course, pressed against the adjacent workpiece placing the workpieces under compression.

When the outer tool is withdrawn, the resulting joint construction has a preload on the workpieces applied in the vicinity of the axis of the shear pin. It is believed that one factor producing this preload is due to the nature of the metal movement which occurs during the flattening of the sheared ring. As a compression load sufficient to deform the material is applied, the ring will attempt to expand radially inwardly as well as radially outwardly. The radially inward expansion urges the length of the pin to be increased by a small but appreciable increment. When installation is complete and the cylindrical tool is withdrawn, the length of the fastener springs back to a slightly shorter length and applies compression or preload to the workpieces.

An additional mechanism which contributes to joint preload also operates during the downward stroke of the outer mandrel. This mechanism operates as follows. The load required to shear material from the upset head of the rivet is typically about 2000 lbs. maximum, dropping to about 1000 lbs. towards the end of the operation for a 3/16 inch diameter rivet having a tail fabricated from 55 TiCB material. This 1000 lb. load compresses the rivet shank in column. When the partially sheared ring contacts the workpiece a further load is applied, typically 6000 lbs. for the rivet before mentioned. All except the 1000 lb. of this load goes to push the workpieces together and then compress them to a slightly lesser thickness locally in the vicinity of the flattened ring. When the outer tool is withdrawn the rivet shank will elongate slightly due to the spring back following release of the 1000 lb. load, and the workpieces will spring back slightly more due to release from the higher 5000 lb. (6000 lb. minus 1000 lb.=5000 lb.) load. Thus, the workpieces will be maintained in a compressed condition between the flat ring and the preformed head. This compressed condition is referred to as preload in the joint. For simplicity, loaded areas and material modulii have been omitted.

While these methods for producing a preload are particularly advantageous in the bi-metallic type rivet discussed above, the methods are also useful in any cold installed metallic rivet.

In addition to the above-described method, the invention includes the resulting rivet which is formed by the method. Such rivet has a cylindrical head with a flattened larger diameter ring on the end of the head adjacent the rivet shank. The head and ring thus have somewhat of a hat shape. The invention also includes the preloaded joint construction provided by the method and includes the apparatus for performing the method.

SUMMARY OF THE DRAWINGS

FIG. 7 is a cross-sectional view of a shear pin with a tail on each end.

FIGS. 8, 9 and 10 are perspective views of riveted joints showing ruptures of one of the workpieces at different locations when the joints are subjected to shear fatigue testing.

FIG. 11 is a cross-sectional view illustrating the head of the invention on a tapered shear pin.

DETAILED DESCRIPTION OF THE SYSTEM ILLUSTRATED IN THE DRAWINGS

Figure 1:
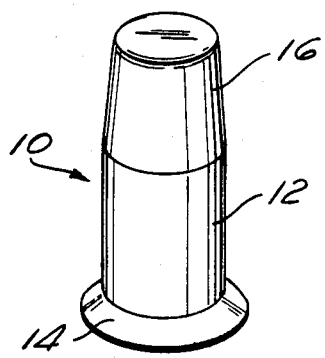
FIG. 1 is a cross-sectional view of a conventional bi-metallic shear pin or rivet.

As indicated above, FIG. 1 illustrates a prior art rivet or shear pin 10 having a cylindrical shank 12 with a preformed or "manufactured" head 14 on one end of the shank and a tail 16 on the other end of the shank, with the diameter of the tail tapering from that of the shank to a reduced diameter on its outer tip. Such a rivet may be made of various materials, but a commonly used rivet which is particularly useful in connection with the method of the invention has a shank formed of 6AL-4V titanium alloy and a ductile, easy to form tail made of 55 Ti 45 CB titanium alloy. These two metals are joined in suitable manner by friction welding such as that disclosed in U.S. Pat. No. 3,848,389.

Figure 2A:
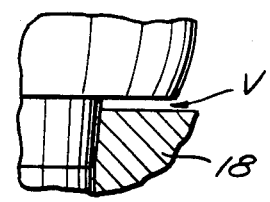
FIG. 2 is a cross-sectional view of a joint construction utilizing the rivet of FIG. 1 and illustrating the gap that can exist between the upset head of the rivet and the adjacent surface of the workpiece, FIG. 2a being an enlargement of the gap area. The extent of the gap is exaggerated for the sake of clarity.
Figure 2:
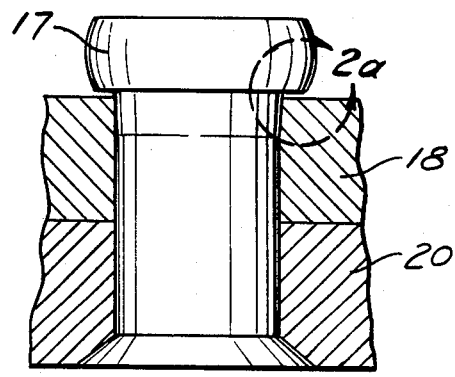

FIG. 2 illustrates the rivet of FIG. 1 installed in a conventional manner, fastening two workpieces 18 and 20 together. As may be seen, the tail 16 of the rivet has been upset axially and deformed radially outwardly to form an upset head 17 which holds the rivet in place. After the squeezing or compressive force on the upset rivet is removed, the column of the rivet shank springs back a certain distance. Although the workpieces 18 and 20 also spring back somewhat, the materials in common use for the workpieces do not spring back as much as the rivet shank with the result that a gap V is formed between the interface of the upset head 19 and the workpiece 20, as seen in FIG. 2a. This gap is acceptable for most practical uses except those involving fatigue loads. As shown in FIG. 2 and FIG. 2a, the shank near the upset head is expanded slightly to prevent looseness. This expansion occurs as the upset head is formed.

Figure 3:
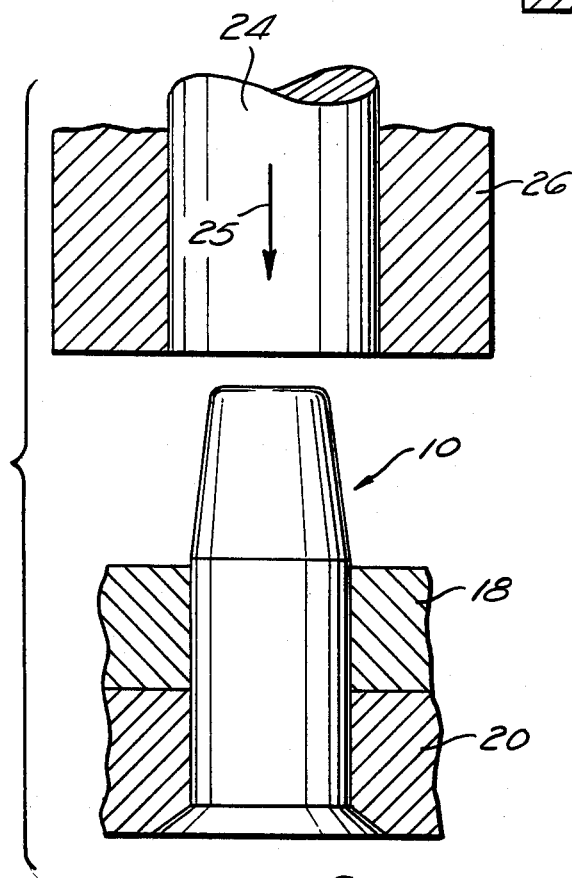
FIG. 3 is a cross-sectional view of a pair of workpieces with a rivet inserted through holes in the workpiece and with a schematic illustration of a tool about to be applied to the rivet in accordance with the method of the invention.
Figure 4:
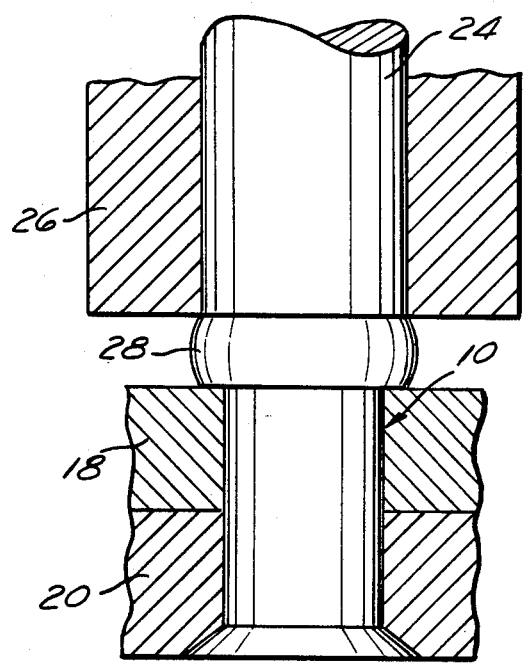
FIG. 4 illustrates the components shown in FIG. 3 at the completion of the first forming step of the invention.

In accordance with the method of the invention, this gap V is eliminated, and the rivet shank is under tension after installation providing a compressive force or preload on the workpieces. A two-part tool assembly is provided to install the rivet. As schematically illustrated in FIG. 3, this includes an inner tool comprising a piston-like pin 24 having a flat end face with a diameter which is larger than the diameter of the rivet shank 12 but is smaller than the diameter of the upset head 28 which is to be formed, as illustrated in FIG. 4. Surrounding the tool pin 24 and slidably mounted thereon is a cylindrical or tubular tool 26. The tool 26 has a flat annular end face which is shown flush with the end face of pin 24 in FIG. 3. Note that the inner tool 24 is positioned above and axially aligned with a rivet 10 extending through workpieces 18 and 20, with the end face of the tool being adjacent the rivet tail 16.

During the initial step of the installation method, the pin 24 is moved downwardly as indicated by the arrows 25 in FIG. 3 to apply a squeezing or axially compressive force to the rivet tail. The rivet preformed head 14 and the workpieces are of course supported by suitable means (not shown) to withstand the load. This force axially compresses the tail and deforms it outwardly into the flattened barrel-like shape illustrated in FIG. 4, forming the upset head 28. The compressive or squeezing force is not normally applied by the outer tool 26. Thus it does not normally deform the rivet during this first step.

Preferably, the outer diameter of the upset head is about 1.3 to 1.5 times the original shank diameter, which as indicated in FIG. 4 is larger than the inner diameter of the outer tool 26. The upset head actually has an outwardly curved or bulged outer periphery such that the diameter on the flat upper end of the upset head is about equal to the inner diameter of the end face of the tool 26, and the outer diameter of the end face of the inner tool 24, but the outermost portion of upset head 28 extends outwardly beyond the inner diameter of the outer tool 26.

Figure 5:
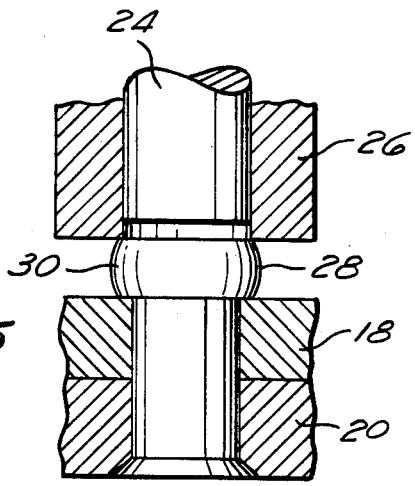
FIGS. 5, 5a, 5b, 5c, and 5d are cross-sectional, schematic views illustrating sequentially the action that occurs during the second squeezing step of the rivet installation method.
Figure 6:
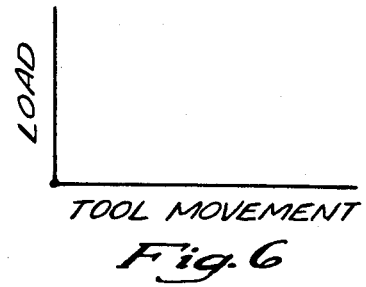
FIGS. 6, 6a, 6b, 6c, and 6d are diagrams illustrating the load versus movement of the outer tool during the various stages of the second compressive step of the rivet installation method, with the diagrams conforming respectively to the stages illustrated in FIGS. 5–5d.
Figure 5A:
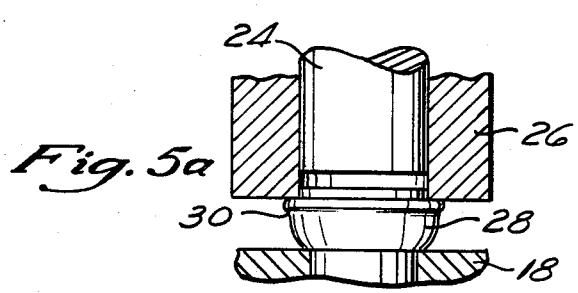
Figure 6A:
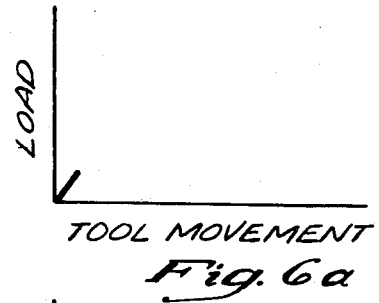

During the second forming step in the method of the invention, the squeezing force on the inner tool 24 is unloaded, and it may be withdrawn slightly as illustrated in FIG. 5. The outer tool 26 remains adjacent the upper end of the upset head. The diagram of FIG. 6 indicates that a load is not yet applied. A squeezing or compressive force is then applied to the upset head by means of the outer tool. As the outer tool moves down it starts to shear the outer ring or annular portion 30 of the head 28, as illustrated in FIG. 5a; and the load increases as illustrated in the diagram of FIG. 6a.

Figure 5B:
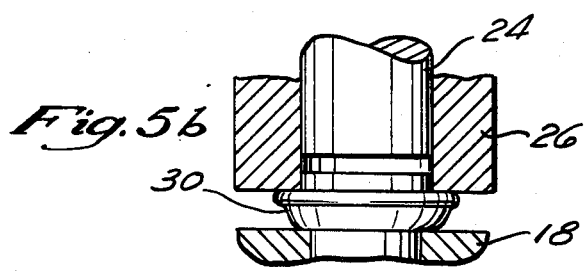
Figure 6B:
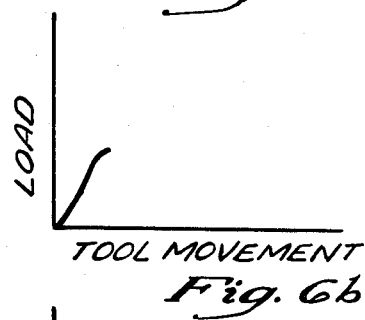
Figure 5C:
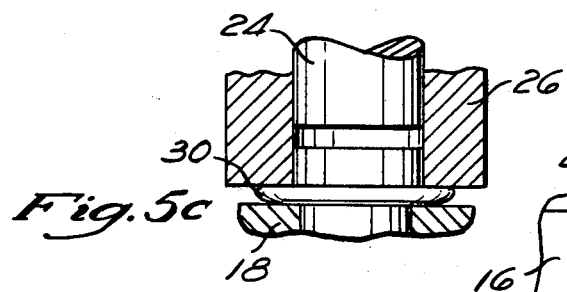
Figure 6C:
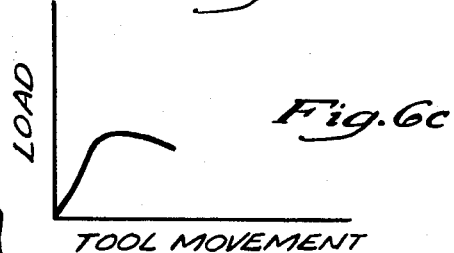
Figure 5E:
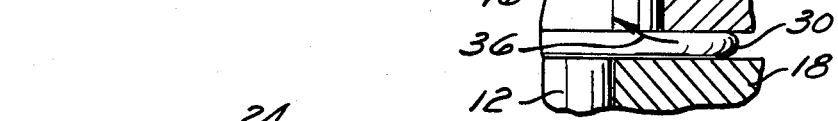
FIG. 5e is an enlargement of a portion of the completed riveted joint of FIG. 5d, illustrating schematically the material movement when the preload is obtained.
Figure 5D:
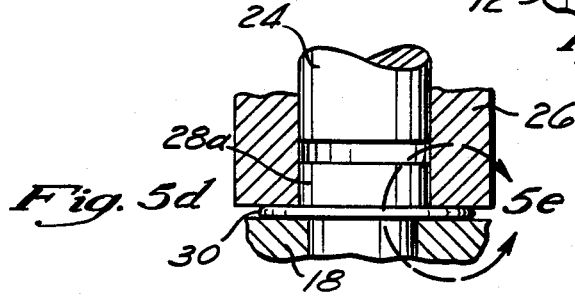

As the outer tool 26 approaches the largest diameter of the upset head as shown in FIG. 5b, the load increases to an initial high point as illustrated in diagram 6b. With continued downward movement of the outer tool 26 to the position illustrated in FIG. 5c, the load decreases slightly due to the reduction in diameter of the upset head, such slight load reduction being illustrated in FIG. 6c. Continued compressive movement of the outer tool 26 deforms the sheared upset head material 30 into a flatter ring as shown in FIG. 5d.

Figure 6D:
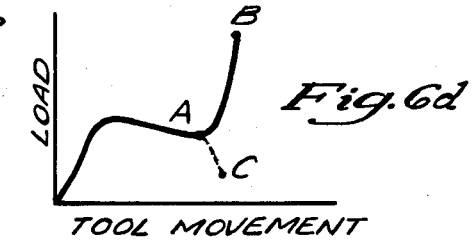

As the material is compressed and swaged further into a flattened ring increasing its outer diameter, the load increases rapidly from point A to point B as illustrated in FIG. 6d. The preload is produced within that portion of the loading diagram because the workpieces 18 and 20 are pressed together through the action of the compressed ring 30 which at all times remains attached to the remaining upset head 28a. As this ring 30 is compressed, it is believed that it tends to expand radially inwardly, as well as radially outwardly, causing the length of the pin to be increased by a small, but appreciable, increment. This tendency toward inward flow of material is illustrated schematically by the small arrow 36 shown in the enlargement of FIG. 5e. When installation is complete and the cylindrical tool 26 is withdrawn, the length of the fastener springs back to a slightly shorter length and applies the desired compression or preload to the workpieces.

An additional mechanism which contributes to joint preload, also operates during the downward stroke of the outer mandrel, 26. This mechanism operates as follows: the load required to shear the ring, 30, from the upset head of the rivet, 28, is indicated by the curve in FIG. 6d between the beginning of the curve and the point A. Between the point A and point B the load on the workpiece exerted by the ring 30 increases to a maximum at B, while the load on the pin tending to collapse it in column reduces to approximately point C on the dotted extension of the curve in FIG. 6d. The load at C felt by the pin is estimated to be about 1/6 of the load at B. The load at B of course represents the combined load on the pin and the load on the workpieces. When the load on the outer anvil is removed, the pin will spring back a small amount due to the removal of the load C, while the workpieces will tend to spring back by a larger amount due to removal of the larger load B minus C. The pin will restrain the spring back of the workpieces and thus, the workpieces will remain in the desired preloaded condition.

In practice, the two mechanisms that tend to provide preload operate simultaneously.

Note that due to the action of the outer tool, the outer diameter of the flattened ring 30 has been increased beyond the diameter of the original upset head 28, as viewed in FIG. 5. With the flattened ring material having been sheared from part of the outer portion of the original upset head shown in FIG. 5, a more completely cylindrical head 28a, as shown in FIG. 5d is left. This gives the head 28a and ring 30 combination a miniature top hat shape with the ring 30 representing the brim. While the size of the upset head 28a and the flattened ring 30 in relation to the shank of the rivet may be varied to some extent, a successful prototype had a maximum upset head diameter as viewed in FIG. 5 of about 1.5 times that of the original rivet shank diameter. This was reduced to a diameter of 1.3 times the original shank 12 diameter in its sheared cylindrical form 28a shown in FIG. 5d, while the flattened ring 30 had an outer diameter of 1.75 times that of the original shank 12 diameter.

The expansion of the ring 30 radially inward sufficiently to produce an appreciable lengthening of the rivet shank 12 during the A to B stage of the installation, as viewed in FIG. 5d, was surprising in that it was not anticipated that lengthening would be of sufficient magnitude to produce a useful result. It has been found however that a rather remarkable improvement is obtained by this mechanism and the additional mechanism also described.

Based on a number of tests of 3/16 inch diameter CherryBUCK fasteners having 6AL-4V titanium for the preformed head and shear portion of the shank welded to a soft tail of 55TiCb, the following are the preferred loadings to be applied to the rivet tail by the inner anvil 24 at the first stage of installation, and by the outer tubular anvil 26 during the second stage of installation. The range of resulting preloads is also shown.

| Preferred Installation Loads | |
|---|---|
| First stage load | 5,800 LB Min/7,800 LB Max |
| Second stage load | 4,500 LB Min/6,500 LB Max |
| Resultant Preload | 500 LB Min/1,000 LB Max |

A chart of lap joint shear fatigue test results is set forth below. For the rivets with preload, first and second stage installation loads were in accordance with those listed above under Preferred Installation Loads. Shown is the number of cycles to failure for the rivet with preload versus the same rivet without preload and also versus a competitive fastener sold under the trademark HI-LOK, which employs a threaded nut on a threaded shear pin. It will be noticed that each of the three different Cherry-BUCK part numbers gave consistent cycles to failure with the special upset, as compared to lower and less consistent cycles to failure with the standard upset. Noticeable also are the favorable cycles to failure of the rivets with the special upset compared to the cycles to failure of the Hi Lok. Due to its very common use throughout the aircraft industry the Hi Lok fastener is widely regarded as an industry standard with the type of fastening applications under discussion here. It is apparent from the results that a very significant improvement has taken place due to the method of installation which produces preload. This dramatic improvement for a fastener not employing a threaded nut is particularly useful in that a one piece fastener lends itself readily to automated installation of rivets.

FATIGUE TESTS
PER MIL-STD-1312, TEST 21
Full Load Transfer, No Restraints
CHERRYBUCK WITH PRELOAD
In 2024-T3 Clad Sheets, 0.123" Thick. Each
At 10 KSI Gross, R = +0.1 (1850/185 Lbs.)
Clearance Holes (0.1900")

| Fastener Part No. | Installation Condition | Fatigue Life (Cycles to Failure) | Failure Code |
|---|---|---|---|
| CSR 926-6-4 | Standard 1.4 D | 427300 | C |
| | Standard 1.4 D | 388260 | B |
| | Special | 533910 | A |
| | Special | 599790 | A |
| CSR 924-6-4R | Standard 1.4 D | 478450 | B |
| | Standard 1.4 D | 438840 | B |
| | Special | 495300 | A |
| | Special | 627610 | A |
| CSR 926-6-5 | Standard 1.4 D | 121350 | C |
| | Standard 1.4 D | 97280 | C |
| | Special | 540120 | A |
| | Special | 490950 | B |
| Hi-Lok (HL11V6-4 Pin, HL70-6 Collar) | Power Tool | 389100 | B |
| | | 367100 | A |

Failure Code A refers to the condition shown in FIG. 8 wherein the top workpiece in a riveted joint breaks at a location spaced from the holes in the workpieces through which the rivets extend.

Failure Code B refers to that shown in FIG. 9 wherein the bottom workpiece of a riveted joint ruptures at a location spaced from the holes in the workpieces through which the rivets extend.

Failure Code C refers to the condition wherein the top workpiece in a riveted joint ruptures on a line through the holes in the top workpiece through which two rivets extend. The upper workpiece is slightly weaker than the lower workpiece at that location because of the countersink in the top workpiece, whereas the bottom workpiece is not countersunk in this example.

It will be noticed that with the rivets in the standard installation condition (no preload), the failure Code C indicates that joints failed across the rivet holes, while with rivets in the special installation condition (with preload), failure Codes B and C indicate that joints failed away from the rivet holes. It is widely considered that when failures occur remote from the rivet holes, the cycles to failure are close to optimum for that particular joint and fastener configuration.

It has been found that the preload is obtained whether the fastener is installed in an interference fit or in a clearance fit hole in the workpieces.

It should be noted that the material sheared from the head 28 does normally not contribute much to the strength of the riveted joints. Thus the advantageous preload is obtained without appreciable loss of strength of the joint formed by the first deforming step, and without the need for additional material to be added to the rivet tail.

While the method described is particularly advantageous with a bimetallic rivet, it is useful with any cold formed rivet operation.

In rare situations, it may be desirable to utilize a shear pin 38 not having a preformed head on either end, as shown in FIG. 7. Both tails 40 of the shear pin 38 can be upset in the manner discussed above to form an upset head 28a and a ring 30, as in FIG. 5d, on each end of the shear pin 38. In theory, the preload could be doubled if both ends were simultaneously formed.

The preload could also possibly be increased by restricting the radially outward flow of materials when the ring 30 is being flattened. This could force more inward material flow, and thus more axial lengthening, and ultimately more "spring back" when the load is removed. This could possibly be accomplished by forming a shallow annular recess (not shown) in the end face of the tool 26. The outer diameter of the recess would be sized to limit outward flow of the ring 30 during the flattening of the ring, so as to increase inward flow.

The top hat-shaped head can, of course, be used on various types of shear pins. FIG. 11 illustrates another arrangement wherein the top hat-shaped head 52 has been formed with preload on the small end of a tapered pin 50. The pin is forced into holes in the workpieces 54 and 56 until the large head or end 51 of the pin prevents further movement. The preloaded head on the tapered pin is more practical than an upset head of the type shown in FIG. 2, wherein the gap between the upset head and the workpiece exists.

I claim:
1. A method of installing a rivet to provide an axial preload on two or more workpieces joined by the rivet, the rivet having a shank and a tail on one end of the shank with the tail being made of deformable material, the method comprising:

inserting the rivet tail and shank through aligned holes in two or more stacked workpieces with the rivet tail extending beyond the face of one of the workpieces;

applying a first axially compressive force to the rivet compressing the tail material axially and deforming the rivet tail against the adjacent workpiece and deforming the material radially outwardly to form an upset head, the diameter of which is greater than that of the shank and the diameter of the hole through the adjacent workpiece;

applying a second axially compressive force separate from said first compressive force to the upset head to partially shear an outer portion of the upset head and compress said portion against the adjacent workpiece to form a flattened ring integral with the upset head; and withdrawing the compressive force from said ring.

2. The method of claim 1 wherein said rivet has a preformed head opposite the tail and including the step of positioning said preformed head against the outer face of a workpiece.

3. The method of claim 1 wherein said portion is compressed against the adjacent workpiece with a force sufficient to urge tail material inwardly and then axially.

4. The method of claim 1, wherein the first axial force is applied until the outer diameter of the upset head is about 1.3 to 1.5 times the diameter of said shank.

5. The method of claim 1 wherein said upset head is sheared to a cylindrical shape about 1.2 to 1.3 times the diameter of the shank.

6. The method of claim 1 wherein said inserting step is performed with sufficient force to insert said shank when it is slightly larger than said holes so that an interference fit between the shank and the holes is obtained.

7. The method of claim 1 wherein said portion is compressed against the adjacent workpiece with a force greater than the force required to partially shear the portion from the upset head.

8. The method of claim 1 wherein the rivet initially has a tail on either end, and including the steps of simultaneously forming an upset head and compressed ring on both tails.

9. A method of installing a rivet to provide an axial preload on two or more workpieces joined by the rivet, the rivet having a shank and a tail on one end of the shank with the tail being made of deformable material, the method comprising:

inserting the rivet tail and shank through aligned holes in two or more stacked workpieces with the rivet tail extending beyond the face of one of the workpieces;

applying a first axially compressive force to the rivet compressing the tail material axially and deforming the rivet tail against the adjacent workpiece and deforming the material radially outwardly to form an upset head, the diameter of which is greater than that of the shank and the diameter of the hole through the adjacent workpiece;

withdrawing the first axial force;

after said withdrawing step, applying a second axially compressive force to the upset head to partially shear an outer portion of the upset head and compress said portion against the adjacent workpiece to form a flattened ring integral with the upset head; and withdrawing the compressive force from said ring.

10. A method of installing a rivet to provide an axial preload on two or more workpieces joined by the rivet, the rivet having a cylindrical shank, a manufactured head on one end of the shank, and a tail on the other end of the shank, comprising:

inserting the rivet tail and shank through aligned holes in said workpieces with said rivet head being positioned adjacent the outer face of one workpiece and with the rivet tail extending beyond the face of the second workpiece;

applying a first axially compressive force to the rivet tail with a pin-like inner tool with force sufficient to upset the rivet tail against the adjacent workpiece and bulge the rivet tail radially outwardly to form an upset head with a diameter greater than the diameter of the hole through the adjacent workpiece;

stopping the application of said first force; and applying a second axially compressive force to an outer ring of the upset head with an outer tool having an end face with a cylindrical opening therein in which the inner tool is slidably mounted, said opening having an inner circular cutting edge with a diameter larger than the hole in the adjacent workpiece and smaller than the largest diameter of the upset head, said outer tool partially shearing an outer ring of the upset head leaving a finished cylindrical head having a diameter larger than the hole in the workpiece, and compressing said ring against the adjacent workpiece to form a flattened ring integral with the lower portion of said cylindrical head.

11. A method of installing a rivet to provide an axial preload on two or more workpieces joined by the rivet, the rivet having a shank, a manufactured head on one end of the shank and a tail on the other end of the shank, with the tail being made of deformable material, the method comprising:

inserting the rivet tail and shank through aligned holes in two or more stacked workpieces with the manufactured head against a workpiece and with the rivet tail extending beyond the face of a second one of the workpieces;

applying a first axially compressive force to the rivet compressing the tail against said one workpiece and deforming the material radially outwardly to form an upset head, the diameter of which is greater than that of the shank and the diameter of the hole through the adjacent workpiece;

applying a second axially compressive force to an outer portion of the upset head to partially shear said outer portion of the upset head leaving a cylindrical upset head portion and applying a third force against said outer portion to compress it into a flattened ring against the adjacent workpiece, and to compress the workpiece, said third force being greater than the second so that when the third force is withdrawn, the workpieces "spring back" more than the rivet shank providing said preload on the workpieces.

12. A method of installing a rivet to provide an axial preload on two or more workpieces joined by the rivet, the rivet having a shank extending through the workpieces and having a head with an outer diameter sufficiently larger than said shank so as to engage the adjacent workpiece and said head being sufficiently axially thick to accommodate the axial load on the installed rivet, said rivet further including a thin flat ring formed integral with the portion of the head adjacent said shank, with the ring having a diameter greater than the head so as to also engage the adjacent workpiece, said method comprising:

applying a force to the ring to compress the ring against the workpieces with a tool having a flat annular face with an opening larger than the head by engaging said flat annular face against said flat ring, said force being sufficiently large to further flatten said ring deforming material radially inwardly to urge said shank to elongate; and removing said force to allow the workpieces and the rivet shank to "spring back".

13. The method of claim 12 wherein said ring is initially formed as an outer part of said head portion and is sheared from such head portion by an axial force and compressed into a flattened ring shape.

14. The method of claim 12 wherein said ring is made of material more ductile than said shank.

15. A method of installing a rivet to provide an axial preload on two or more workpieces joined by the rivet, the rivet having a shank and a tail on one end of the shank with the tail being made of deformable material, the method comprising:

inserting the rivet tail and shank through aligned holes in two or more stacked workpieces with the rivet tail extending beyond the face of one of the workpieces;

applying a first axially compressive force to the rivet compressing the tail material axially and deforming the rivet tail against the adjacent workpiece and deforming the material radially outwardly to form an upset head, the diameter of which is greater than that of the shank and the diameter of the hole through the adjacent workpiece;

applying a second axially compressive force to an outer portion of the upset head with an outer tool movable separately from the tool applying said first force, said outer tool having a cutting edge with an inner diameter larger than the aligned hole in the adjacent workpiece but smaller than the outer diameter of said upset head to partially shear said outer portion of the upset head and compress said portion against the adjacent workpiece to form a flattened ring integral with the upset head; and withdrawing the compressive force from said ring.

16. The method of claim 15 wherein the first axial force is applied radially within said outer portion.

17. A method of joining two workpieces with a rivet in a manner such that the workpieces are held under compression by the rivet after the riveting operation is complete, the installed rivet having a shank extending through aligned holes in the workpieces and heads on the ends of the shank of larger diameter than said holes applying compressing force to said workpieces, said method comprising:

compressing a thin flat ring on one end of the shank against one of said workpieces with a tool having a flat end face with a central opening which surrounds the adjacent rivet head on said one end, said ring being integral with and extending radially outwardly from said adjacent head, said ring being axially thinner than said adjacent head, said ring compressing occurring while compressive force is not being applied to the axial end of said adjacent head, said compressing being with sufficient force to flatten said ring by said flat end face and to urge ring material radially inwardly to apply an elongating force to said shank so that the shank will "spring back" when the ring compressing is stopped;

compressing the rivet head on the other end of said shank against the other workpiece while said ring compressing is occurring; and ceasing said compressing steps.

* * * * *